United States Patent [19]

Aulds et al.

[11] Patent Number: 4,710,641

[45] Date of Patent: Dec. 1, 1987

[54] PROPORTIONAL DRIVE SERVO CONTROLLER WITH ARRAYED POSITION DETECTOR

[75] Inventors: James M. Aulds, Oxford; Roger J. Becker, Kettering, both of Ohio

[73] Assignee: The United States of America as represented by the Secretary of the Air Force, Washington, D.C.

[21] Appl. No.: 879,718

[22] Filed: Jun. 27, 1986

[51] Int. Cl.⁴ .......................................... G01N 21/86
[52] U.S. Cl. .................................... 250/554; 250/561
[58] Field of Search ............... 250/554, 561; 340/578; 346/107 R

[56] References Cited

U.S. PATENT DOCUMENTS

| | | | |
|---|---|---|---|
| 2,404,903 | 7/1946 | Cohen | 250/554 |
| 2,446,718 | 8/1948 | Ray | 250/554 |
| 2,659,264 | 11/1953 | Tuttle et al. | 352/39 |
| 3,366,439 | 1/1968 | Buck et al. | 352/84 |
| 3,392,524 | 7/1968 | Caveny | 60/39.47 |
| 3,449,758 | 6/1969 | Lavine | 346/107 R |
| 3,587,424 | 6/1971 | Paine | 354/137 |
| 4,442,523 | 4/1984 | Bricks | 372/56 |
| 4,496,980 | 1/1985 | Pfleiderer et al. | 358/212 |
| 4,531,143 | 7/1985 | Maserjian | 357/23.6 |
| 4,644,175 | 2/1987 | Bucefari et al. | 250/561 |

OTHER PUBLICATIONS

AIAA-85-1257, Application of a Copper-Vapor Laser to High-Speed, High Resolution, Front Lit Cinephotography of Solid Propellant Deflagration, J. L. Laird et al, Jul. 8-10, 1985.

Primary Examiner—David C. Nelms
Assistant Examiner—William L. Oen
Attorney, Agent, or Firm—Gerald B. Hollins; Donald J. Singer

[57] ABSTRACT

A precise position control for maintaining the burn face of a propellant sample within a precise optical depth of field positional range during burn face recession that may be non-uniform in nature. The position control employs an array of laser excited binary signal optical sensors with closed loop digital and analog electronic signal processing.

15 Claims, 4 Drawing Figures

PROPORTIONAL DRIVE SERVO CONTROLLER WITH ARRAYED POSITION DETECTOR

RIGHTS OF THE GOVERNMENT

The invention described herein may be manufactured and used by or for the Government of the United States for all governmental purposes without the payment of any royalty.

CROSS-REFERENCE TO RELATED PATENT APPLICATION

This application relates to the copending applications "High Resolution Cinephotographic System", Ser. No., 879,726 "Laser Photography Pulse Synchronization Circuit", Ser. No. 879,717. "Optical Correlator for Analysis of Random Fields", Ser. No. 881,420, and "Chemical Inhibitor for Solid Propellants", Ser. No., 07/046,742 all except the latter of which are filed of even date herewith and hereby incorporated by reference herein.

BACKGROUND OF THE INVENTION

This invention relates to the field of high accuracy, closed loop position controlling apparatus.

In the study of burn phenomena of solid rocket propellant or grain, an interesting conflict between grain burning characteristics and photography physics is encountered. This conflict arises from the relatively small depth of field inherent in the optics of a desirable photographic system in comparison with the particle sizes occurring in state-of-the-art solid rocket propellant grain. Particle sizes in the range of 400 micrometers are, for example, to be expected in propellant grain before and during burning, while the photographic system used for recording grain burn events can be limited to depth of field characteristics as low as of 20 micrometers. Additionally since the burn rate of such solid propellant grain is in the order of 0.02 meters/second, or 20,000 micrometers per second it is clear that an in-focus view of a burning propellant grain surface over several seconds of time requires constant attention to positioning the burning surface within the camera optics depth of field. A high-resolution tracking capability linking the burn receding grain surface and advancement of the grain body is, in fact, desirable for this linking. Such capability is provided by the apparatus of the instant invention.

The patent art includes several examples of apparatus related to differing aspects of the present invention. Included in this art is the patent of Bernard G. Bricks, U.S. Pat. No. 4,442,523, which concerns a high-powered metal vapor laser such as a lead vapor laser or copper vapor laser. Also included in this art is the patent of Hans Joerg Pfleiderer et al, U.S. Pat. No. 4,496,980, which teaches a semiconductor image sensor apparatus concerned with signal integration. Further included in this art is the patent of Joseph Maserjian, U.S. Pat. No. 4,531,143, relating to a semiconductor device actuatable by the output energy of a laser.

Another patent of this art issued to L. H. Caveny, as U.S. Pat. No. 3,392,524, and concerns a burn rate sensor for a solid propellant rocket motor. The Caveny rocket motor employs burn rate sensing and controlling tubes and electrical resistance variations in order to control the burn surface area and the burn rate of the rocket motor. Additionally, the patent of F. E. Tuttle et al. U.S. Pat. No. 2,659,264, concerns an arrangement for determining velocity and acceleration characteristics of moving objects through the use of photographic images containing the moving object and a uniformly lined screen pattern and a superimposed second lined screen.

The patent art also includes the patent of T. O. Paine, U.S. Pat. No. 3,587,424, which concerns a laser camera and diffusion filter combination. The Paine apparatus employs a high-speed camera that utilizes the rotating reflector mirror principle and also employs a kerr cell for commencing and terminating the laser operation in accordance with the Q-spoiling operating mode.

The patent art also includes the patent of W. E. Buck et al, U.S. Pat. No. 3,366,439, which concerns a laser illumination and shuttering arrangement for high-speed photography. In the Buck et al patent, an argon gas pulsed laser is used in conjunction with a rotating mirror and a slitted stop plate for illuminating and photographing workpiece objects. The slitted stop plate in the Buck et al invention provides improved rise and fall times for the workpiece illumination. The Buck et al apparatus also contemplates photographic recording of a self-luminous event and employs monochromatic laser illumination with filters for suppressing the non-laser illumination.

While these examples of the patent art indicate considerable inventive activity in the high-speed photography art, none of these prior patents suggest the combination of elements and the precise rocket propellant workpiece sample positioning achieved in the present invention.

SUMMARY OF THE INVENTION

An electronic circuit capable of locating an eroding workpiece such as a propellant sample or propellant rod within a precise and narrowly defined positional range in order that photography by an optical apparatus of severely limited depth of field characteristics is possible. The invention employs a closed-loop electronic circuit which includes digital, analog, time-sharing, integrating and other processing operations.

An object of the invention therefore, is to provide an accurate dynamic workpiece position controlling apparatus.

Another object of the invention is to provide a position controlling apparatus responsive to the random variations of a surface eroding phenomenon.

Another object of the invention is to provide a position controlling apparatus having high immunity to the presence of smoke and other "noise" forms.

Another object of the invention is to provide a positioning apparatus wherein attained position sensing is accomplished with an array of digital signal transducer elements.

Another object of the invention is to provide a positioning apparatus which realizes the benefits of combined analog and digital signal processing.

Another object of the invention is to provide a position controlling apparatus wherein a plurality of position sensing signals are multiplex sampled to form a serially processed composite signal.

Another object of the invention is to provide a surface positioning apparatus which employs laser illumination and optical processing of the position sensing signal.

These and other objects of the invention are achieved by an apparatus for maintaining the eroding burn face of a movable solid rocket propellant sample positioned along an axial path within the limited depth of field of a camera system, including an arrangement for advancing the propellant sample along the axial path in response to an electrical driving signal, a linear array of optical-to-electrical transducer elements disposed along the axial path adjacent the propellant sample and optical eclipse responsive to both the burn surface eroding and the propellant sample feeding, an arrangement for determining the number of transducer elements illuminated and the number eclipsed by the propellant sample at each instantaneous position of the burn surface, an arrangement for storing numerical values representing the respective number of illuminated transducer elements found in two successive samples of an output signal from the arrangement for determining, an arrangement for converting one of the stored numeric values to an analog signal, an arrangement for generating the electrical driving signal in response to the difference between the analog signal and a first reference signal.

Additional objects and features of the invention will be understood from the following description and the accompanying drawings.

DETAILED DESCRIPTION

Figure 1:
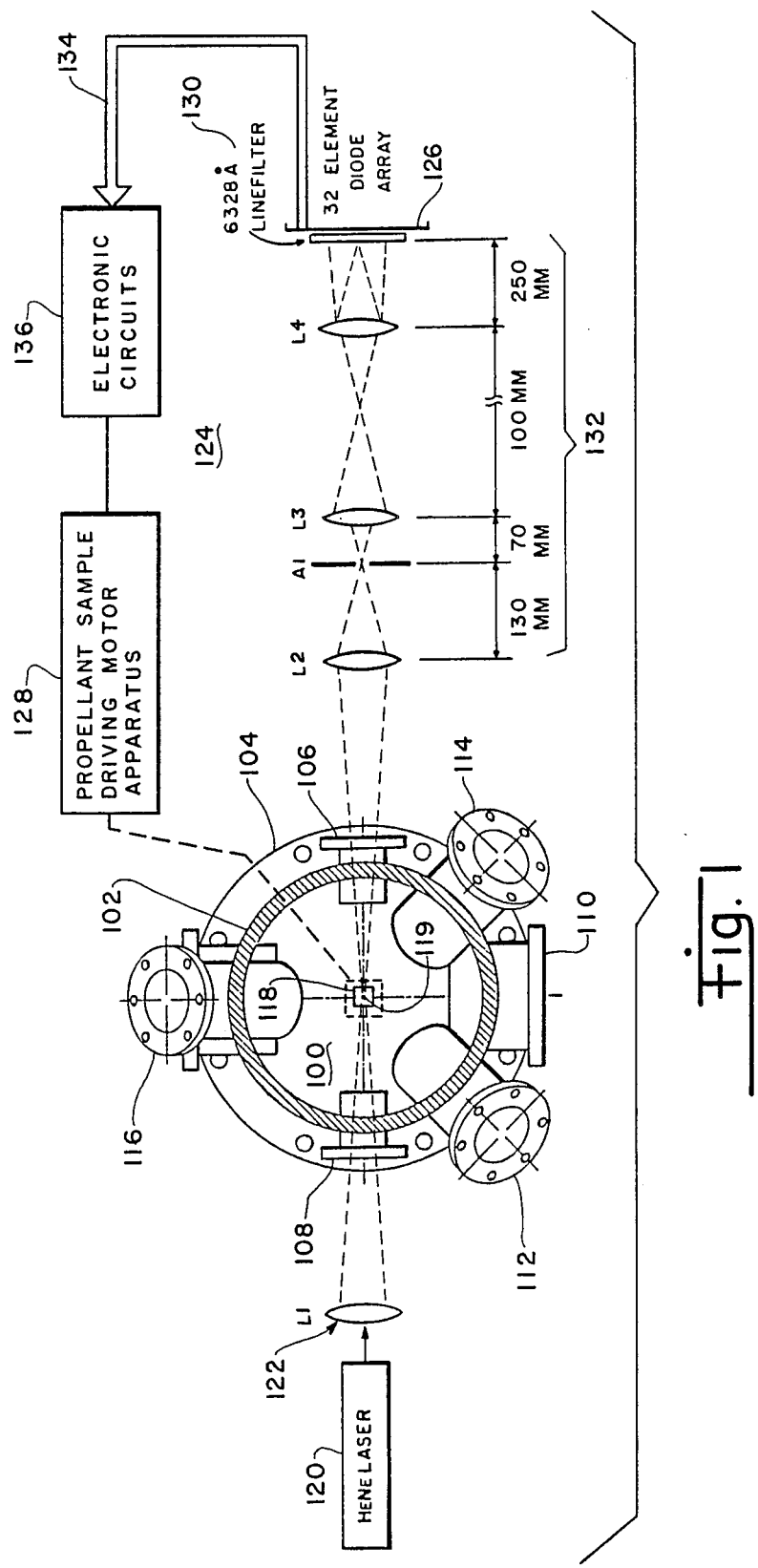
FIG. 1 is an overall view of a solid rocket propellant testing vessel wherein the apparatus of the present invention may be advantageously employed.

FIG. 1 in the drawings shows a top view of a testing pressure vessel wherein the burning surface characteristics and other properties of solid rocket propellant samples may be observed under controlled and repeatable laboratory conditions. The FIG. 1 apparatus includes a burning chamber 100 located within a cylindrical vessel 102 that is received in upstanding relationship with respect to a closure member or mounting flange 104. The cylindrical vessel 102 includes a plurality of optical ports 106, 108, 110, 112, 114, and 116 located in various positions and angles with respect to a central axis of the chamber 100. Additional details of the vessel 102 and the ports therein are recited in the above incorporated by reference copending patent application "High Resolution Cinephotographic System". Two of the illustrated vessel 102 ports, the ports 106 and 108, are of special interest with respect to the present invention apparatus, since these ports provide avenues for entrance and exit of laser illumination used in controlling the vertical position of the propellant sample being examined in the chamber 100. The propellant sample 119 being examined in the FIG. 1 apparatus is received by way of a sample aperture 118 located in the flange 104 at the bottom of the chamber 100.

The chamber 100 is of course, fitted with a sealable top member, which is not shown in FIG. 1 for the sake of drawing convenience, and with light transmitting but pressure-tight optical elements within each of the ports 106–116. The FIG. 1 apparatus provides a controlled environment in which the burning surface of a rocket propellant grain sample can be closely observed in the laboratory with precision and with the conveniences of precise sample burn face location, combustion product evacuation and other benefits.

During use of the FIG. 1 apparatus, the propellant sample is inserted through the aperture 118 in a movable but pressure sealable manner. This sample has its end surface beveled at a 45 degree angle so as to be orthogonal with respect to one of the ports 112, 114 or 116. The beveled sample surface is illuminated through one of the ports illustrated in FIG. 1 and is also aligned with another selected port for accomplishing the camera exposure. During the burning and camera exposure events, elevation of the sample 119 and the burn surface located thereon is dynamically controlled by an electric motor and screw thread plus ramp apparatus, that is, by the propellant sample driving motor apparatus 128 which is disposed immediately below the burn chamber 100 and coupled to the lower end of the propellant grain sample 119. The propellant sample driving motor apparatus is energized by the electronic circuits 136 to complete the closed loop dynamic control apparatus. The electronic circuits 136 comprise the circuits shown in FIGS. 2, 3 and 4 of the drawings and an additional higher current coupling circuit driven by the output of the FIG. 4 circuit. Signals from the diode array 126 are coupled to the electronic circuits 136 along the multiple channel path 134.

For actuating the dynamic sample elevation control, light from a source such as the laser 120, preferably a helium-neon laser or some similar low energy, low-cost laser, is used. This light passes through an appropriate optical system 122 which may include lenses and other optical apparatus, and enters the chamber 100 by way of the port 108 where a portion of its optical energy is received on the propellant grain sample 119 and another portion passed transversely of the propellant sample, above the beveled end thereof. In the FIG. 1 representation the optical energy portion passing above the propellant grain sample emerges through the port 106 into the optics 124 of the detector array 126. This light entering and leaving the chamber by way of the ports 108 and 106 is therefore used to sense the vertical position of the propellant grain sample in the chamber 100 and thereby provides an electrical output signal from the detector array 126, as is described in greater detail in connection with FIG. 2 below.

The beveled end of the propellant sample 119 is a satisfactory source of the silhouette imaged on the detector array 126 notwithstanding its beveled end surface because the linear photodetector array receives the image of only a small portion of the strand sample surface. It is therefore desirable to maintain the predetermined strand or sample profile. For this reason the sample sides are preferably treated with an inhibitor, as in described in the copending incorporated-by-reference application "High-Resolution Cinephotographic System". Alternately, the entire sample cross-section could be viewed by using a two-dimensional array. The optical system 124 in FIG. 1 which is disposed between the laser 122, the vessel 102 and the detector array 126 includes lenses L1, L2, L3 and L4; the latter of these lenses are preferably spaced according to the dimensions indicated at 132. The lenses L1, L2, L3 and L4 are preferably of focal lengths 120 mm, 120 mm, 35 mm, and 25 mm, and in the arrangement shown in FIG. 1 provide a magnification of 20. The aperture A1 serves to block out flame emission in the general vicinity of the strand surface, passing only light emanating from the spatial region of interest, and the line filter 130 which is preferably of the indicated 6328 angstrom passband center spectral frequency serves to block unwanted flame emission, passing only the laser radiation. Other optical arrangements are, of course, possible for coupling the burn face elevation signal to the detector array 126.

Figure 2:
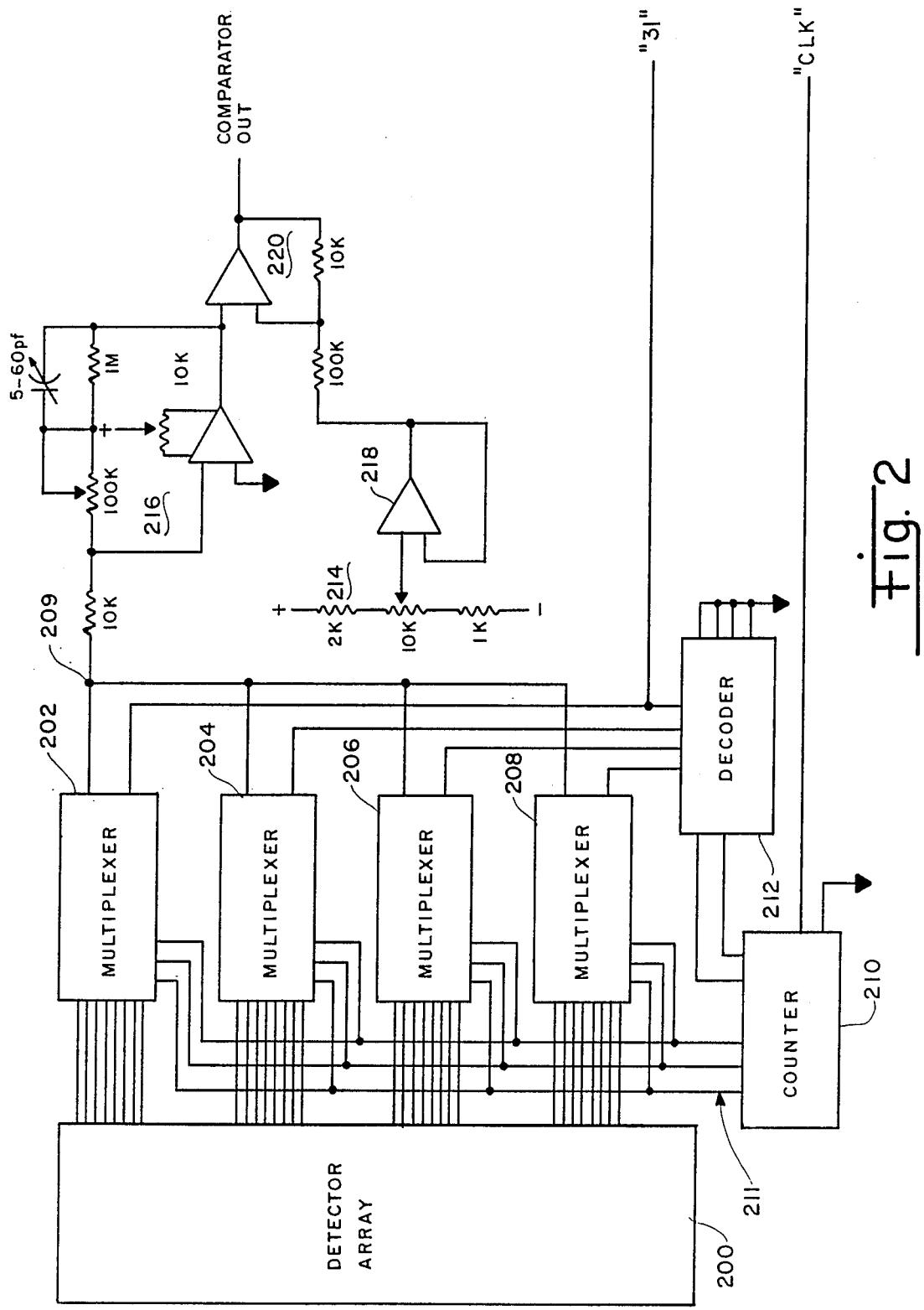
FIG. 2 is an electrical schematic diagram of the optical-to-electrical transducer array and input circuitry portions of an apparatus embodying the invention.

An electrical representation of an optical-to-electrical transducer array suitable for use with the FIG. 1 apparatus is shown at 200 in FIG. 2 of the drawings. The array 126 in FIG. 1 or its electrical representation at 200 in FIG. 2 preferably is a linearly disposed series of optically responsive or photodiode elements arranged in a linear top-to-bottom positional sequence with the long dimension extending parallel to the propellant sample or in the direction of the vertical axis extending from below the FIG. 1 page through the plane of the page and up toward the viewer. For the present embodiment of the invention, the use of 31 elements of a 32-element detector array such as the Hamamatsu S994-19 diode array is preferred. The electrical output from the individual elements of the detector array 200 appears on the four 8-conductor buses, the topmost of which is indicated generally at 201 in FIG. 2. One photodiode detector element is coupled to each bus conductor in the FIG. 2 arrangement. A common ground connection for the 32 diode elements of the array 200 is presumed in FIG. 2.

By way of the indicated vertically adjacent disposition of detector elements in the array 200, the position of the propellant sample within the chamber 100 in FIG. 1 is directly related to the presence or absence of an output signal on appropriate ones of the bus conductors 201, etc. The resolution between sample position and detector adjacent element spacing is, of course, adjustable by way of the magnification included in the optics 124 in FIG. 1. Preferably a sample movement of 50 micrometers upwards out of the page in FIG. 1 will result in the change of one bus conductor from the positive output signal or illuminated state to the zero output signal or darkened state. The capture range of the FIG. 1 apparatus is about 1.6 millimeters.

The binary signals 201 etc. indicating position of the propellant sample within the chamber 100 are converted to a serial signal representing elevation of the sample burn surface within the chamber 100; this conversion employs the multiplexer circuits 202, 204, 206 and 208 in FIG. 2. Operation of these four multiplexer circuits is controlled by the counter circuit 210 and the counter decoding circuit 212. By way of this control, commutation or conduction occurs within one of the multiplexer circuits to connect one of the detector array output signals with the signal node 209 for a unique assigned time interval. One of the four multiplexers 202-208 is selected by the decoder 212, while the output 211 from the counter 210 controls which detector array 200 output signal is being processed. According to this arrangement, the three low order bits of the counter are used to select which of the eight inputs of an individual multiplexer circuit is active and the two high-order bits from the counter 210 determine which of the multiplexer circuits 202-208 is enabled. Thereby the signal from each photodiode is received at the node 209 at a unique time.

Each of the components in the FIG. 2 circuit may be obtained from a number of different manufacturers, however, the detector array 200 is preferably a type S994-19 32-element array manufactured by Hamamatsu Inc. of Japan, the multiplexers 202, 204, 206 and 208 are preferably a type 4051 manufactured by RCA Corporation, the counter 210 a type 4040 manufactured by Motorola Incorporated, the decoder 212 a type 4556 manufactured by RCA Corporation, and the operational amplifier circuits at 216, 218 and 220 are preferably type LF356 manufactured by National Semiconductor Corporation. The indicated digital circuits, the multiplexer, counter, and decoder, are CMOS, complementary metal oxide semiconductor circuits. Other circuit type can, of course, be employed as are known in the electronic art.

The serial signal appearing at the node 209 is amplified in the operational amplifier circuit 216 and fed to the comparator circuit 220. The amplifier 216 includes three adjustments, a dc level or zero adjustment, the 10K potentiometer; a 10% gain adjustment, the 100K potentiometer; and a frequency response adjustment, the 5–60 pf variable capacitor. The variable capacitor, frequency response adjustment, is useful in reducing the transmission of multiplexer switching transients through the amplifier 216.

The comparator circuit 220 selects the light level arriving at the cells of the detector array 200 which is capable of causing a change in the comparator output signal. The comparator circuit 220 may also be comprised of an operational amplifier circuit—an amplifier circuit that is connected for high gain switching mode operation. The comparator circuit 220 compares the instantaneous value of the amplified serial signal from the node 209 with a buffered fixed value reference signal derived from the voltage divider 214. Reference signal buffering is provided by the unity gain amplifier 218. The output signal from the comparator circuit 220 therefore comprises a digital signal that persists in the active output state for a time proportional to the separation of the propellant sample burn surface from a predetermined nominal position in the chamber 100.

Figure 3:
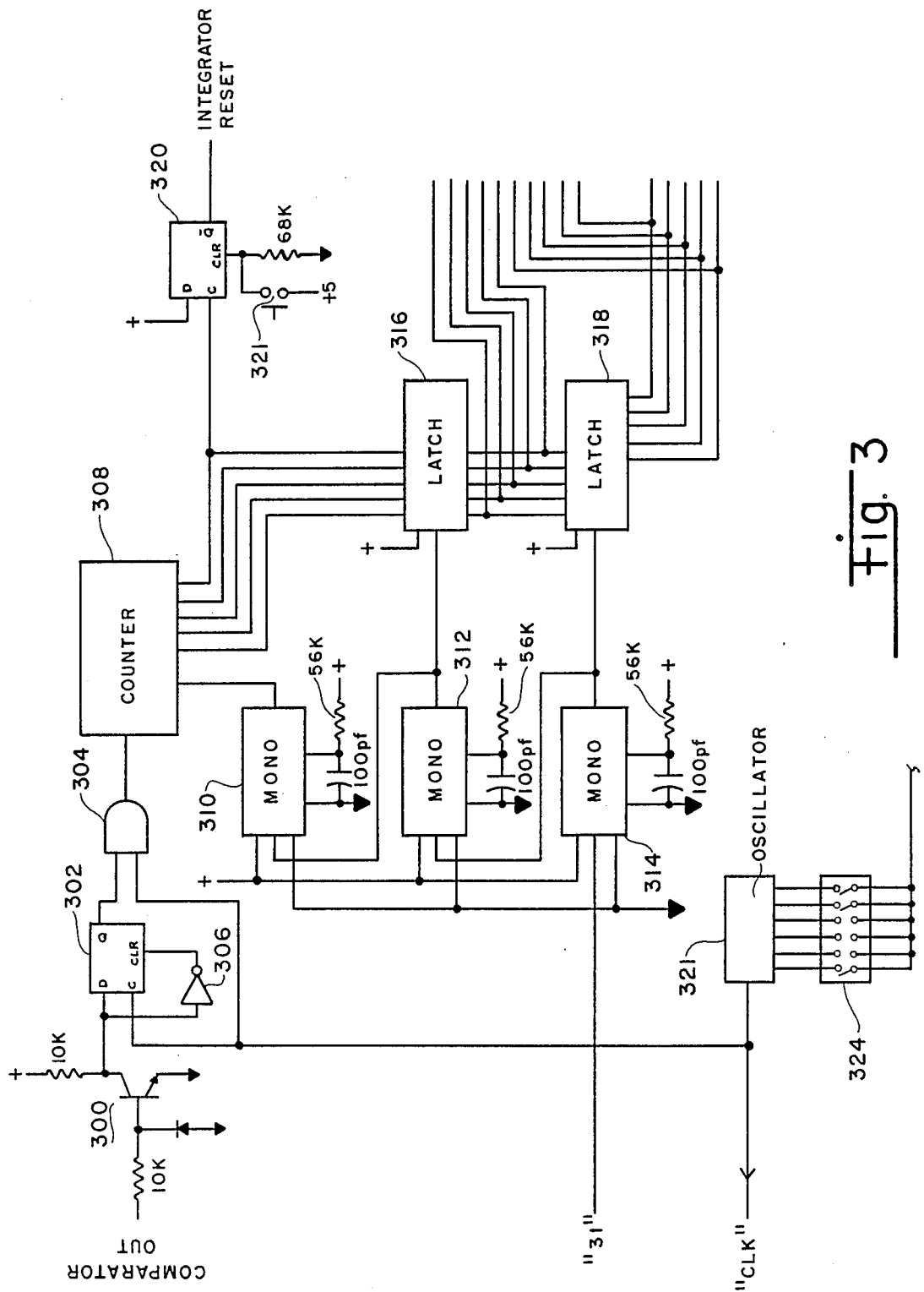
FIG. 3 shows the digital processing circuitry for an embodiment of the invention.

The "31" signal in FIG. 2 which originates in the decoder 212 is used to initiate data transfer events by the monostable multivibrator circuits 310, 312, and 314 in FIG. 3 of the drawings. The clock signal "CLK" shown in FIG. 2 is used to step the counter 210 through its operating states, this clock signal originates in the oscillator 322 in FIG. 3.

Referring now to the circuitry in FIG. 3, the comparator output signal is used to drive a signal level changing circuit 300 in order that the comparator output voltage swing of −12 to +12 volts be converted to a 0 to +15 volt signal swing suitable for use with the CMOS flip-flop and inverter circuits 302 and 306. The bipolar transistor in the circuit 300 may be of the 2N3904 type and the diode in the base circuit of this transistor of the 1N4150 type, both commercially available items in the electronic component market.

The output of the level converter circuit 300 is coupled to the flip-flop circuit 302 to provide a clock synchronized propellant sample elevation signal. When the D input of the flip-flop circuit 302 is held high by the elevation signal output of the level converter circuit 300, then on the next low-to-high clock transition the flip-flop output will rise to the high state. Since this transition occurs one-half clock cycle after the multiplexer has been selected, the amplifier and comparator circuits will have had time to settle to stable output values at the flip-flop D input. The AND gate 304 confines the flip-flop output duration to the clock signal interval. The counter 308 accumulates or counts the number of array elements or sample pixels having output signals representing light input above the value of the threshold established by the divider 214.

The counted number of illuminated array elements is transferred to the memory or storage circuits 316 and 318 in FIG. 3 in response to the delayed pulses originating in the three monostable or one-shot multivibrators 310, 312 and 314. The monostable multivibrators each provide an output pulse of predetermined time duration and collectively provide for the transfer of a given count of data from the counter 308 to the latch 316 and thence to the latch 318. The latches 318 and 316 therefore respectively store numerical values indicating the number of previously illuminated and the number of currently illuminated elements in the array 200. The counter 308 is reset by an output pulse from the monostable multivibrator 310. The high-order bit from the counter 308 is also used to trigger the flip-flop circuit 320, a flip-flop whose complemented output terminal ($\bar{Q}$) provides an integrator reset signal upon receipt of a manual reset command from the switch 321.

The integrated circuit blocks indicated in FIG. 3 are also available from commercial suppliers. The oscillator 322 is available as a switch (i.e., the switch 324) selected frequency control circuit known as the PXO-1000 circuit manufactured by Statek Corporation, the monostable multivibrators 310, 312 and 314 may be type 4528 circuits manufactured by Motorola Incorporated, while the flip-flops 302 and 320 may be type 4013 circuits also manufactured by Motorola Incorporated. Additionally, the inverter 306 and AND gate 304 may be type 4049 and 4081 circuits manufactured by RCA Corporation, and the latch circuits 316 and 318 may be embodied as type 4174 circuits manufactured by RCA Corporation. All of the FIG. 3 circuits are of the CMOS circuit type, excepting, of course, for the level correcting transistor circuit 300.

Figure 4:
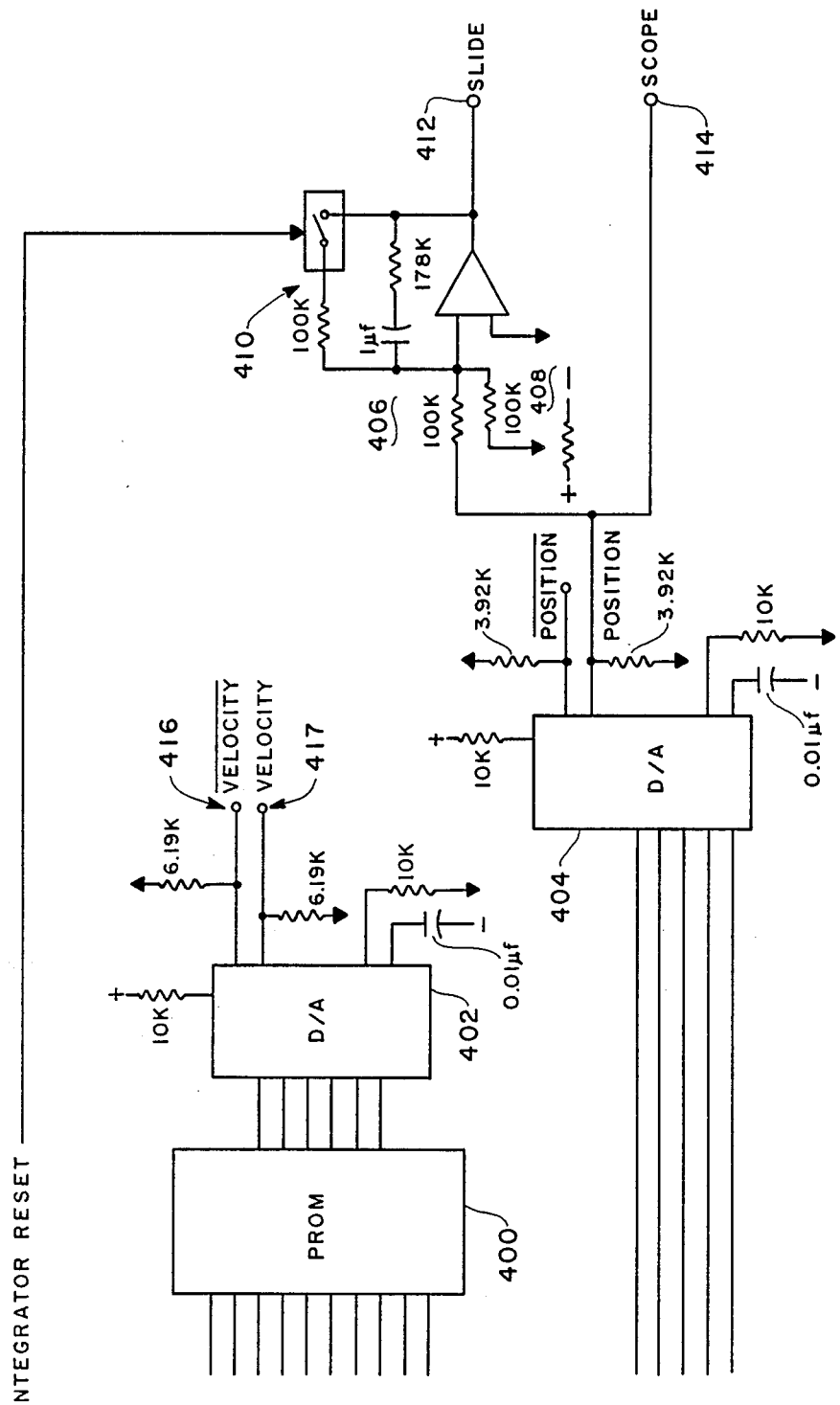
FIG. 4 shows the digital-to-analog converter and output analog processing for the invention embodiment.

In FIG. 4 of the drawings, the continuum of data representing currently illuminated array elements and previously illuminated array elements that is stored in the latches 316 and 318 is received in the PROM circuit 400 where a subtraction according to a plurality of possible subtraction algorithms is performed. The digital output of the PROM 400 therefore represents the algorithm adjusted difference between the previously illuminated and currently illuminated array element counts and is coupled to a digital-to-analog converter circuit 402 that provides complemented analog velocity signals at the terminals 416 and 417.

The digital output from one of the latch circuits, the circuit 318 in FIG. 3, is shown connected to a second digital-to-analog converter 404 for providing a pair of complemented analog signals indicating positional location of the propellant sample burn face within the chamber 100. The time integral of the position signal provided by the digital-to-analog converter 404 is provided by the integrator circuit 406 in FIG. 4, and appears at terminal 412. By way of the potentiometer 408 a reference signal, which preferably corresponds to one-half of the array 200 being illuminated, is introduced into the integrator circuit 406; the terminal 412 output of the integrator circuit is therefore made to be the integral of the difference between the position signal and the selectable reference signal derived from the potentiometer 408. The integrator 406 is held in the reset condition by the integrator reset signal and the circuitry 410 until the flip-flop 320 in FIG. 3 is clocked out of the reset condition by the occurrence of more than 16 photodiode elements of illumination in the array 200 in FIG. 2.

Once this 16-element release of the integrator reset occurs, the output from terminal 412 is capable of actuating the propellant sample driving motor apparatus, such as a motor-driven cam and cam follower as represented at 128 in FIG. 1. The closed loop apparatus which includes the elements 124, 134, 136 and 128 in FIG. 1 can be adjusted to maintain a propellant sample feed that will maintain half of the array 200 elements illuminated on a dynamic closed-loop basis, if more than half of the array elements become illuminated, the output voltage at terminal 412 will increase and thereby seek to increase the output velocity of the propellant sample feeder 128 in FIG. 1.

The change in position per unit time or velocity difference signal available at the terminals 416 and 417 of the FIG. 4 circuit can be employed to supplement the output of the integrator 412 for additional feedback to the propellant sample feeder 128 in the form of an anticipator signal or for other performance enhancement uses as are known in the art. Such input to the system might, for example, be useful in the presence of larger 128- or 256-pixel diode arrays, for faster damping of startup or burning transient events in the system or for otherwise controlling the sample burn face position more precisely. A particular flexibility of the signal at the terminals 416 and 417 resides in the possibility of programming the subtraction accomplished in the PROM 400 to be other than a simple subtraction, e.g., a subtraction having deadband center characteristics, or a nonlinear subtraction having a component of output signal that is magnitude dependent on one or more of the input signals or a time delayed subtraction. The availability of both a velocity and position output signals from the FIG. 4 circuitry is a notable feature.

During operation of the FIGS. 2, 3 and 4 circuitry, a reset command received at the switch 321 maintains the flip-flop 320 and the integrator 406 in the reset condition until the array 200 changes from a more than half-dark condition as results from an overly long propellant sample in the chamber 100 to a less than half-dark condition. At this occurrence the flip-flop 320 changes state by way of the high-order bit transition received from the counter 308 and the integrator 406 is released to commence operation of the circuit. Starting a test with the described apparatus therefore involves positioning the propellant sample so that more than half of the detector elements are dark or eclipsed or silhouette covered, depressing the reset switch and commencing the propellant combustion. When the propellant sample has receded to a condition exposing more than one-half of the detector elements, the flip-flop 320 is toggled and the integrator 406 commences operation and dynamic control of the propellant sample burn face location.

The integrated circuits used in embodying the FIG. 4 apparatus may be again, of a variety of such circuits available in the electronic component market, however, a type 2716 PROM manufactured by Hitachi Corporation is preferred at 400 in FIG. 4, and digital-to-analog converters of the DAC0800 type manufactured by National Semiconductor Incorporated are preferred at the blocks 402 and 404, respectively. The integrator 406 may use an operational amplifier of the LF356 type as previously described for the elements 216, 218 and 220 in FIG. 2.

The illustrated arrangement for propellant sample feeding is found capable of maintaining the burn surface of a propellant sample within a positional range of 100 micrometers. Accurately focused images of such a precisely controlled surface are, of course, much more feasible and within the 150 micrometer depth of field characteristics of a practical camera optics system.

It should also be realized that the effects of optical fouling from smoke and other combustion products are minimized in the herein-disclosed apparatus, especially in comparison with position sensors of the type employing a single optical-to-electrical transducer element whose output is proportional to the amount of transducer element illuminated surface. Such single element transducer cells have, of course, been used for position sensing previously, but can be readily understood to be first-order responsive to smoke or other optical fouling effects which directly influence the transducer output signal level. In such an arrangement, the addition of smoke to optical elements, of course, is indistinguishable from the generated position signal occurring from shadowing of the transducer element by the propellant element workpiece. A high throughput purge of air or other selected gases may, of course, be used to minimize the effect of smoke and optical fouling in the described apparatus. The described apparatus is also capable of accommodating propellant sample burn rates which are somewhat random and variable in nature, burn rates between 1 and 4 cm/sec are commonly experienced.

Use of the disclosed apparatus in environments other than a burning propellant sample is, of course, feasible: especially in the presence of deflagrating or ablating surfaces, the disclosed apparatus may be employed to maintain a surface in fixed position. The combination of such moving surfaces with a noise environment as represented by the smoke and combustion product optical noise of the present environment is also a notable capability of the disclosed apparatus.

While the apparatus and method herein described constitute a preferred embodiment of the invention, it is to be understood that the invention is not limited to this precise form of apparatus or method, and that changes may be made therein without departing from the scope of the invention, which is defined in the appended claims.

We claim:

1. Apparatus for maintaining the eroding burn surface of a movable solid rocket propellant sample positioned along an axial path within the limited depth of field of a camera system comprising:
   electromechanical means for advancing said propellant sample along said axial path in response to an electrical driving signal;
   a linear array of optical-to-electrical transducer elements disposed along said axial path adjacent said propellant sample and optical eclipse responsive to both said burn surface eroding and said propellant sample feeding;
   means for determining the number of said transducer elements illuminated and the number eclipsed by said propellant sample at each instantaneous position of said burn surface;
   means for storing numerical values representing the number of illuminated transducer elements found in two successive samples of an output signal from said means for determining;
   means for converting one of said stored numeric values to an analog signal; and
   means for generating said electrical driving signal in response to the difference between said analog signal and a first reference signal.

2. The apparatus of claim 1 wherein said means for determining the number of transducer elements illuminated includes multiplexer means for generating an electrical signal having time sequential segments each representing the instantaneous output of one transducer element in said array of transducer elements.

3. The apparatus of claim 2 wherein said means for determining also includes analog-to-binary comparator circuit means for comparing the instantaneous value of said time sequential electrical signal with a second reference signal.

4. The apparatus of claim 3 wherein said burn surface is illuminated by a monochromatic source of light and viewed at said monochromatic spectral frequency by said camera system.

5. The apparatus of claim 4 wherein said source of light is a laser.

6. The apparatus of claim 5 wherein said laser is a copper vapor laser.

7. The apparatus of claim 3 wherein said optical-to-electrical transducer elements are photodiode elements.

8. The apparatus of claim 7 wherein said first reference signal is selected in response to the number of illuminated and eclipsed elements in said array during steady state operation of said apparatus.

9. The apparatus of claim 8 wherein said number of illuminated elements and said number of eclipsed elements are equal.

10. The apparatus of claim 9 wherein said means for advancing includes an electric drive motor.

11. The apparatus of claim 10 wherein said linear array of transducer elements comprises a number of elements greater than thirty.

12. Closed loop dynamic position maintenance apparatus comprising:
    a movable, consumable workpiece having a consumption work surface at one end thereof;
    a narrow workpiece consumption region axially disposed of and of small axial extent around a nominal locus of said work surface and having fixed location with respect to axial movements of said workpiece;
    means for driving said workpiece axially across said consumption region;
    optical energy source means directed transversely of said workpiece for energizing position sensing means attendant thereto;
    position sensing means including a plurality of binary signal generating sensing cell elements disposed axially of said small region of consumption for generating a plurality of electrical signals each representative of the presence or absence of workpiece shielding of an element in said plurality of elements from said optical energy source means; and
    circuit means for actuating said means for driving in response to the absence of said workpiece shielding of a predetermined plurality of said sensing cell elements and deactuating said means for driving in response to attainment of workpiece shielding of said predetermined plurality of sensing cell elements;
    said circuit means for actuating including multiplexer means for serially sampling said plurality of sensing cell binary signals and digital-to-analog converter means for converting said serial sample signal to an analog signal capable of actuating said means for driving.

13. The apparatus of claim 12 wherein said circuit means includes means for generating an analog position signal and means for generating an analog velocity signal.

14. The apparatus of claim 13 wherein said means for generating an analog velocity signal includes digital subtraction means for computing the difference between two sequential positions of said workpiece.

15. The method for initiating predetermined positioned control of a receding propellant rod burn face to locate said burn face within a limited optical depth of field position range comprising the steps of:

sensing said propellant rod burn face position in response to optical silhouette energy received in a plurality of depth of field traversing transducer elements, said sensing including generating a plurality of position identified binary signals each individually responsive to presence and absence of said silhouette energy;

controlling the propellant rod axial position and said propellant rod silhouette length in response to a propellant feed signal;

generating said propellant feed signal in response to the difference between said binary signals and a predetermined position reference signal;

commencing propellant burn with said silhouette exceeding said predetermined length and said axial position controlling in an inactive reset condition; and releasing said axial position controlling from said inactive reset condition thereof in response to said length exceeded silhouette and said binary signals attaining a predetermined condition thereof:

whereby dynamic position control commences with movement of said propellant rod toward said predetermined position and silhouette length.

* * * * *

UNITED STATES PATENT AND TRADEMARK OFFICE
CERTIFICATE OF CORRECTION

PATENT NO. : 4,710,641

DATED : December 1, 1987

INVENTOR(S) : James M. Aulds et al

It is certified that error appears in the above-identified patent and that said Letters Patent is hereby corrected as shown below:

Col 6, line 9, "type" should be --types--.

Col 12, line 16, Claim 15, ":" should be --;--.

Signed and Sealed this

Twelfth Day of July, 1988

Attest:

Attesting Officer

DONALD J. QUIGG

Commissioner of Patents and Trademarks